(12) United States Patent
Blouw et al.

(10) Patent No.: US 10,860,630 B2
(45) Date of Patent: Dec. 8, 2020

(54) METHODS AND SYSTEMS FOR GENERATING AND TRAVERSING DISCOURSE GRAPHS USING ARTIFICIAL NEURAL NETWORKS

(71) Applicant: Applied Brain Research Inc., Waterloo (CA)

(72) Inventors: Peter Blouw, Breslau (CA); Christopher David Eliasmith, Waterloo (CA)

(73) Assignee: Applied Brain Research Inc., Waterloo (CA)

(*) Notice: Subject to any disclaimer, the term of this patent is extended or adjusted under 35 U.S.C. 154(b) by 243 days.

(21) Appl. No.: 15/994,603

(22) Filed: May 31, 2018

(65) Prior Publication Data

US 2019/0370389 A1    Dec. 5, 2019

(51) Int. Cl.
*G06F 16/332* (2019.01)
*G06N 3/04* (2006.01)
(Continued)

(52) U.S. Cl.
CPC ...... *G06F 16/3329* (2019.01); *G06F 16/9024* (2019.01); *G06F 40/20* (2020.01);
(Continued)

(58) Field of Classification Search
CPC ......... G06N 20/00; G06N 3/02; G06F 40/30; G06F 40/56
See application file for complete search history.

(56) References Cited

U.S. PATENT DOCUMENTS 8,548,951 B2 * 10/2013 Solmer ............... G06F 16/93
 707/661
10,229,111 B1 * 3/2019 Filippova ............ G06F 40/30
(Continued)

OTHER PUBLICATIONS

Augenstein, Isabelle, Andreas Vlachos, and Kalina Bontcheva. "Usfd at semeval-2016 task 6: Any-target stance detection on twitter with autoencoders." Proceedings of the 10th International Workshop on Semantic Evaluation (SemEval-2016). 2016.*
(Continued)

*Primary Examiner* — Matthew H Baker
(74) *Attorney, Agent, or Firm* — Elan IP Inc.

(57) ABSTRACT

A system for generating and performing inference over graphs of sentences standing in directed discourse relations to one another, comprising a computer process, and a computer readable medium having computer executable instructions for providing: tree-structured encoder networks that convert an input sentence or a query into a vector representation; tree-structured decoder networks that convert a vector representation into a predicted sentence standing in a specified discourse relation to the input sentence; couplings of encoder and decoder networks that permit an input sentence and a "query" sentence to constrain a decoder network to predict a novel sentence that satisfies a specific discourse relation and thereby implements an instance of graph traversal; couplings of encoder and decoder networks that implement traversal over graphs of multiple linguistic relations, including entailment, contradiction, explanation, elaboration, contrast, and parallelism, for the purposes of answering questions or performing dialogue transitions; and a spiking neural network implementation of the aforementioned system components.

12 Claims, 5 Drawing Sheets

(51) Int. Cl.
*G06F 16/901* (2019.01)
*G06F 40/20* (2020.01)
*G06N 3/02* (2006.01)
*G06N 20/00* (2019.01)

(52) U.S. Cl.
CPC ............. *G06N 3/0454* (2013.01); *G06N 3/02* (2013.01); *G06N 20/00* (2019.01)

(56) References Cited

U.S. PATENT DOCUMENTS

| | | | | |
|---|---|---|---|---|
| 10,395,118 | B2* | 8/2019 | Yu | G06K 9/00711 |
| 2014/0236577 | A1* | 8/2014 | Malon | G06F 40/30 704/9 |
| 2015/0356401 | A1* | 12/2015 | Vinyals | G06F 40/40 706/15 |
| 2018/0329883 | A1* | 11/2018 | Leidner | G06N 3/082 |
| 2018/0336183 | A1* | 11/2018 | Lee | G06F 40/30 |
| 2019/0370389 | A1* | 12/2019 | Blouw | G06F 40/30 |

OTHER PUBLICATIONS

Guo, Maosheng, et al. "Generating textual entailment using residual LSTMs." Chinese Computational Linguistics and Natural Language Processing Based on Naturally Annotated Big Data. Springer, Cham, 2017. 263-272.*
Zhao, Jake, et al. "Adversarially regularized autoencoders." arXiv preprint arXiv:1706.04223 (2017).*
Nie, Yixin, and Mohit Bansal. "Shortcut-stacked sentence encoders for multi-domain inference." arXiv preprint arXiv:1708.02312 (2017).*
Ampomah, Isaac KE, Seong-bae Park, and Sang-jo Lee. "A Sentence-to-Sentence Relation Network for Recognizing Textual Entailment." World Academy of Science, Engineering and Technology International Journal of Computer and Information Engineering 10.12 (2016): 1955-1958.*
Do, Phong-Khac, et al. "Legal question answering using ranking SVM and deep convolutional neural network." arXiv preprint arXiv: 1703.05320 (2017).*
Lyu, Chen, et al. "Deep learning for textual entailment recognition." 2015 IEEE 27th International Conference on Tools with Artificial Intelligence (ICTAI). IEEE, 2015.*

* cited by examiner

| | Source | Status | Mean likert rating (1-5) | Confidence interval* |
|---|---|---|---|---|
| 12 → | Human | Entailment | 4.38 | [4.31, 4.47] |
| 13 → | Model | Entailment | 3.59 | [3.45, 3.73] |
| 14 → | Human | Neutral | 3.71 | [3.61, 3.81] |
| 15 → | Human | Contradiction | 1.51 | [1.42, 1.60] |

*Margins are bootstrapped 95% confidence intervals.

FIG. 5

METHODS AND SYSTEMS FOR GENERATING AND TRAVERSING DISCOURSE GRAPHS USING ARTIFICIAL NEURAL NETWORKS

FIELD OF THE INVENTION

The present invention relates to the field of natural language processing with applications to automated question answering, text summarization, and dialogue systems.

BACKGROUND OF THE INVENTION

Natural language processing (NLP) technologies are designed with the goal of enabling computers to perform useful tasks by manipulating text. Narrowly, these tasks include things like parsing, categorizing, and translating both documents and sentences. More broadly, these tasks also include things like question answering and dialogue generation, which exemplify the feasibility of computers systems that understand and reason about language in the same ways that people do.

One insight gleaned from existing efforts to build systems that accomplish these broader tasks is that getting a computer system to exhibit some understanding of a given linguistic expression requires getting it to draw inferences concerning what follows from, is ruled out by, and otherwise goes along with the expression. For example, to exhibit an understanding of the sentence "The dancers parade down the street," a computer system must be able to infer that (a) the dancers are moving, that (b) the dancers are outside, and that (c) there is likely an audience nearby. Being able to draw these kinds of common-sense inferences can enable a system to answer such questions as "Are the dancers standing still?" and "Are the dancers outside?", which can in turn provide evidence that the system exhibits linguistic comprehension to some degree.

Given this conceptual background, a number of systems have been developed to perform the task of recognizing textual entailment (RTE), wherein two sentences are presented as input, and a computational procedure is used to determine whether the truth of the first sentence, called the premise, entails the truth of the second sentence, called the hypothesis (Giampiccolo et al. 2007. The third pascal recognizing textual entailment challenge. Proceedings of the ACL-PASCAL workshop on textual entailment and paraphrasing). Via such a procedure, an RTE system might take the sentences "The dancers parade down the street" and "The dancers are outside" and predict that the second sentence follows from the first.

Traditionally, RTE systems have made use of hand-crafted rules concerning entailment and contradiction relations between specific lexical items (e.g. "cat" entails "animal"), and algorithms that attempt to transform a premise sentence into the corresponding hypothesis via substitutions that rely on these rules. More recently, artificial neural networks have been used to produce high-dimensional vector representations of sentences, which are then provided as input to a classifier that assigns an inferential relationship to a sentence pair (Bowman et al. 2015. A large annotated corpus for learning natural language inference. Proceedings of the 2015 Conference on Empirical Methods in Natural Language Processing). Gradient descent is used to optimize the parameters of these systems to accurately predict the labels assigned to a large number of training sentence pairs. Artificial neural networks currently provide state-of-the-art performance on many RTE tasks.

However, current neural network systems for RTE are limited in their application for three reasons. First, they only perform classification tasks that involve assigning labels to sentence pairs, and therefore cannot be directly used to answer questions or generate dialogue. Second, they consider only logical relations such as entailment and contradiction, and therefore cannot account for the full range of discourse relations that govern everyday conversation. Third, many RTE systems rely on a model of neural network computation that is largely atemporal, and therefore poorly suited to performing tasks that unfold over time, as both question-and-answer interactions and more generic dialogues do.

With respect to the issue of temporality, spiking neural networks are a class of artificial neural network that are particularly well-suited to problems that involve controlling a system's behavior through time (Eliasmith C., 2013. How to Build a Brain: A Neural Architecture for Biological Cognition. Oxford University Press). Such networks are inherently temporal in that they process information via the time-dependent transmission of information pulses (i.e. spikes). When implemented on specialized hardware devices called neuromorphic computers, spiking neural networks can use a small fraction of the power consumed by more traditional computing devices.

SUMMARY OF THE INVENTION

It is an object of this invention to implement a procedure for generating multiple sentences that stand in a specified discourse relation to an arbitrary starting sentence using tree-structured artificial neural networks. Optionally, the sentence generation procedure can be used to generate "discourse graphs," or explicit networks of sentences that stand in directed discourse relations to one another. Entailment is a primary example of such a discourse relation; other relations include contradiction, elaboration, explanation, contrast, and parallelism. Optionally, these discourse graphs can be traversed by conditionally generating novel sentences on the basis of supplied prompts or queries. Sentences generated in this conditional manner can predict either answers to questions or utterances in a dialogue. It is an aspect of this invention that the aforementioned procedures for generating sentences, discourse graphs, and conditioned responses are implemented either in spiking neural networks or in non-spiking neural networks.

The invention at issue uses tree-structured artificial neural networks to transform an initial sentence into an arbitrary number of further sentences that are all related to it in some specific way. The initial sentence is first encoded into a high-dimensional vector representation using a tree-structured neural network (Socher et al. 2014. Grounded compositional semantics for finding and describing images with sentences. Transactions of the Association of Computational Linguistics, 2, 207-218), for which the tree-structure in question is determined by a syntactic parse of the sentence. The resulting vector representation is then decoded into a new sentence via a separate tree-structured network. Because the decoding network can be assembled into an arbitrary number of distinct tree structures, an arbitrary number of novel sentences can be generated. The coupled encoding-decoding procedure just described can repeated using each of these novel sentences, allowing for an indefinitely large discourse graph to be generated from a single starting sentence.

In some cases, the novel sentence generated by the decoder is shorter than the input sentence, in which case the decoding can be interpreted as performing a kind of automated summarization. In other cases, the novel sentence is longer than the input sentence, in which case the decoding can be interpreted as a kind of automated linguistic generalization.

The invention at issue also uses additional inputs to the decoding network to condition the generation of a novel sentence on information beyond that contained in the vector representation of the initial sentence. Specifically, a second vector representation is added to the input to the decoder network, which forces it to generate a novel sentence that takes into account both the initial sentence and the conditioning information. Most often, the conditioning information takes the form of a question that gets encoded into a vector representation. The sentence generated by the decoding network is then an answer to the question. More generally, the inclusion of conditioning information in the decoding process allows for the discourse graphs implicit in the parameters of the encoder and decoder networks to be selectively traversed over the course of a dialogue or question-and-answer session. Any process that guides or controls the manner in which the encoding and decoding procedures are iterated and/or conditioned can be used to implement a dialogue system, which may alternate between traversing over discourse graphs that encode distinct linguistic relations.

The individual computing elements within each tree-structured neural network in some cases transmit a constant value determined by their input, and are thereby non-spiking. In other cases, the computing elements emit occasional pulses in a manner determined by their input, and are thereby spiking. Spiking versions of the neural networks are in some cases implemented using conventional computers via software that emulates the process by which a neuron's input triggers a spike. In other cases, the neural networks are implemented using neuromorphic hardware that physically instantiates spike-based communication between computing elements.

In both the spiking and non-spiking cases, each layer may include gating mechanisms that enable the selective propagation of information to either parent or child nodes in the tree. The architecture of the gating mechanism may include that of a long short-term memory architecture (Hochreiter, S. & Schmidhuber, J. 1997. Long short-term memory. Neural Computation, 9.8, 1735-1780) or that of a gated recurrent unit architecture (Chung et al. 2014. Empirical evaluation of gated recurrent neural networks on sequence modeling. arXiv preprint arXiv:1412.3555).

BRIEF DESCRIPTION OF THE DRAWINGS

For a more complete understanding of the invention, reference is made to the following description and accompanying drawings, in which:

FIG. 5 is an illustration of experimental results evaluating the quality of predictions generated by the system for a discourse graph concerning the relation of entailment.

DETAILED DESCRIPTION OF EXEMPLARY EMBODIMENTS

Figure 1:
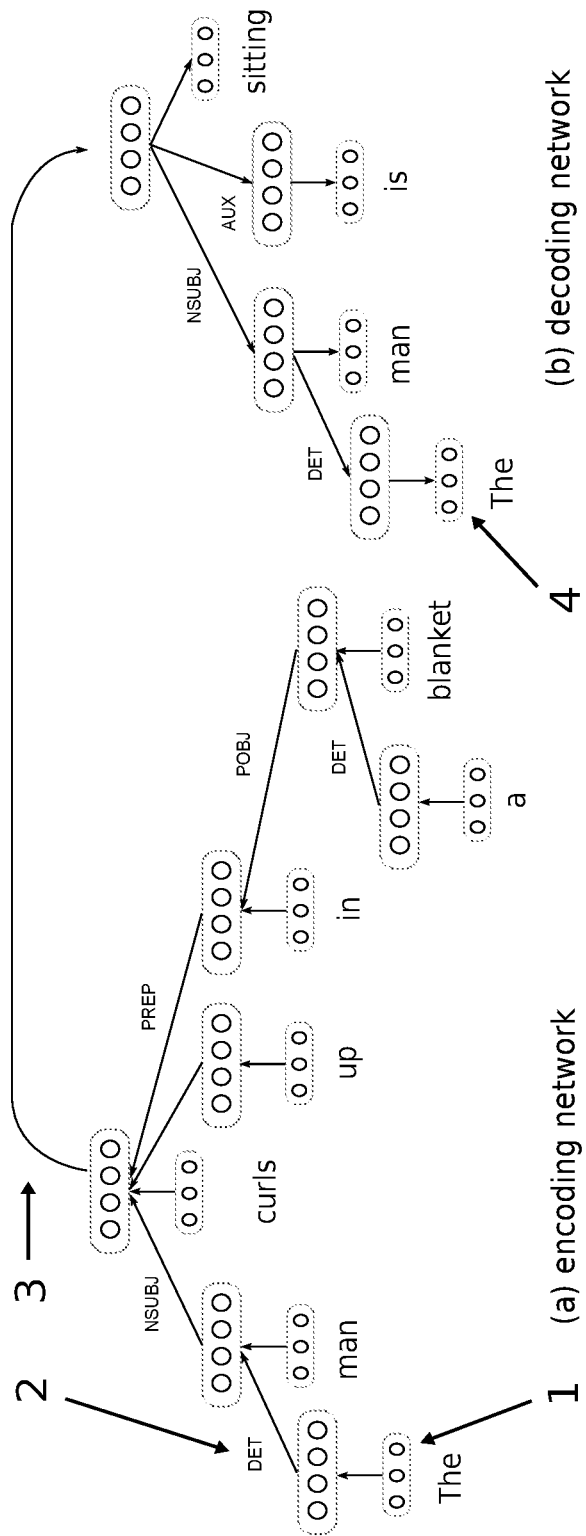
FIG. 1 is a diagram of the coupled encoder and decoder networks generating a predicted sentence.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. Program code is applied to input data to perform the functions described herein and to generate output information. The output information is applied to one or more output devices, in known fashion.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer usable instructions may also be in various forms, including compiled and non-compiled code.

It should also be noted that the terms coupled or coupling as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term communicative coupling may be used to indicate that an element or device can electrically, optically, or wirelessly send data to another element or device as well as receive data from another element or device.

The described embodiments are methods, systems, and apparatuses that generally provide for performing discourse graph generation using artificial neural networks. As used herein the term 'neuron' refers to spiking neurons, continuous rate neurons, or arbitrary nonlinear components used to make up a distributed system. The term 'discourse graph' refers to a set of sentence pairs generated by a computer processor executing computer readable instructions stored on a computer readable medium, wherein each pair contains two sentences standing in a linguistic relation characterizing a type of conversational transition that occurs in discourse. The term 'graph of sentences' refers to a more generic set of computer-generated sentence pairs, wherein each pair contains two sentences standing in a relation that may or may not characterize a type of conversational transition that occurs in discourse.

The described embodiments enable the generation and traversal of graphs of sentences that stand in directed discourse relations to one another; 'traversal' here refers to a computational process wherein some subset of the sentences in a graph are visited in a specific order. The described embodiments are comprised of an encoder neural network assembled into an indefinite number of tree-structures, along with a decoder neural network, coupled to the encoder neural network, assembled into an indefinite number of tree-structures. The term 'tree-structure' here refers to a hierarchical grouping of elements in which each element has zero or one 'parent' elements above it in the hierarchy, and an arbitrary number of 'child' elements below it in the hierarchy. FIG. 1 depicts examples of tree-structures, wherein each structural element is a neural network layer, where the term 'neural network layer' refers to a collection of simulated neurons that accumulate input from one or more other collections of simulated neurons and propagates output to one or more other collections of simulated neurons. Each neural network layer comprises a plurality of nonlinear components, wherein the nonlinear components are simulations of neurons that generate spikes. The non-linear components are implemented either in software, or in special-purpose neuromorphic hardware. The term 'neuromorphic hardware' here denotes any computing device that physically instantiates spike-based communication between processing elements.

Computer representations of input words are provided to the bottom-most elements in the encoder neural network, and propagate activity through it to produce a single fixed-width vector representation of the input words. This vector representation is then used to propagate activity through the decoder neural network to generate a predicted sentence satisfying a discourse relation of interest, wherein the encoder neural network and the decoder neural network are artificial neural networks implemented in network layers by a computer processor executing computer readable instructions stored on a computer readable medium.

The described embodiments optionally include multiple instantiations of the decoder neural network coupled with the same instantiation of the encoder neural network, so as to predict multiple distinct output sentences using the same collection of input word representations. An 'instantiation' of the encoder or decoder neural network refers to an arrangement of neural network layers into a specific tree structure. The described embodiments also optionally include weight matrices in the encoder and decoder neural networks that are tied to specific syntactic relations in each tree-structure, such that the same set of weights is used for each occurrence of a given syntactic relation in a given tree-structure. The described embodiments also optionally include non-linear transformations performed by each network layer that involve a gating mechanism.

Iterative applications of encoding and decoding carried out by the encoding and decoding neural networks are used to generate discourse graphs from a single input sentence. The links in these discourse graphs correspond to standard linguistic relations including entailment, contradiction, elaboration, explanation, contrast, and parallelism. Two or more instantiations of the encoding neural network provided with distinct input word representation are optionally coupled to an instantiation of the decoding neural network, wherein inputs to the encoder neural networks may include question-sentence pairs, and the output predicted by the decoder neural network may include answers to the question-sentence pairs. Iterative applications of encoding with two or more collections of input words and decoding are optionally used to traverse arbitrary discourse graphs for the purposes of implementing a dialogue system or a question-answering system.

The parameters of the encoding and decoding neural networks are determined through error-driven learning rules including backpropagation. The term 'backpropagation' refers to a method for computing the partial derivative of a cost function with respect to each parameter in a neural network so that each parameter can be modified slightly to lower the value of the cost function. The term 'cost function' refers to a function that assigns a scalar value to a collection of predicted network outputs on the basis of their difference from a corresponding collection of target outputs. The described embodiments use error-driven learning rules to optimize objective functions that may promote the decoding of novel sentences that exhibit the following relations to the sentences provided as inputs during encoding: entailment, contradiction, elaboration, explanation, contrast, and parallelism. The terms 'cost function' and 'objective function' are used interchangeably in what follows.

The described embodiments can be implemented using a combination of adaptive and non-adaptive components. The system can be efficiently implemented on a wide variety of distributed systems that include a large number of nonlinear components whose individual outputs can be combined together to implement certain aspects of the system as will be described more fully herein below.

Examples of nonlinear components that can be used in various embodiments described herein include simulated/artificial neurons, FPGAs, GPUs, and other parallel computing systems. Components of the system may also be implemented using a variety of standard techniques such as by using microcontrollers. Also note the systems described herein can be implemented in various forms including software simulations, hardware, or any neuronal fabric. Examples of mediums that can be used to implement the system designs described herein include Neurogrid, Spinnaker, OpenCL, Loihi, and TrueNorth.

Existing work on applying neural networks to the problem of generating natural language has almost uniformly focused on using recurrent networks to map an input word sequence to some target word sequence (e.g., Sutskever et al. 2014. Sequence to sequence learning with neural networks. Advances in Neural Information Processing Systems). While such networks have been applied to the problem of generating one specific type of graph, namely an entailment graph (Kolesnyk et al. 2016. Generating natural language inference chains. arXiv preprint arXiv:1606.01404), they make use of a sequential generation procedure that assigns a single sentence as the most likely output for a given input sentence. In contrast, the use of coupled tree-structured networks in the present invention assigns a most likely sentence for an arbitrary number of tree structures during decoding, and can therefore be used to estimate much more complex graphs covering a diverse range of discourse relations. Moreover, the use of tree-structured networks permits a degree of control over the syntactic and lexical properties of generated sentences that is missing in systems that rely on recurrent architectures. For example, it is possible using the present invention to specify that a generated sentence must contain a prepositional phrase modifying the subject noun.

The present invention relies on a novel coupling of tree-structured encoder and decoder networks. The core idea behind the use of tree-structured networks is to produce a parse tree for a sentence, and then transform the tree into a neural network by replacing its edges with weights and its nodes with layers of artificial neurons (Socher et al., 2012. Semantic compositionality through recursive matrix-vector spaces. Proceedings of the 2012 Joint Conference on Empirical Methods in Natural Language Processing and Computational Natural Language Learning). Activation is then propagated up the tree by providing input to layers that correspond to certain nodes, as shown in FIG. 1. The input at each node is typically a distributed representation or "embedding" [1] corresponding to a single word (Blouw & Eliasmith, 2013. A neurally plausible method for encoding word order information into a semantic vector space. Proceedings of the 35th Annual Meeting of the Cognitive Science Society). The weights used to assemble the network are determined by the syntactic relations defining the underlying parse tree [2], and the same weights are used for each instance of a particular syntactic relation across all possible trees (Socher et al. 2014). All of the leaf nodes in the encoding tree (i.e., nodes that do not depend on other nodes) are assigned embeddings by applying a simple transformation to their underlying word embeddings:

$$h_i = f(W_v x_i + b) \quad (1)$$

where $h_i$ is the embedding for some leaf node i in the tree, $x_i$ is the embedding for the word corresponding to this node, $W_v$ is a matrix that transforms word representations, b is a bias term, and f is an element-wise nonlinearity. Second, embeddings are recursively assigned to all of the non-leaf nodes by composing the embeddings of their children as follows:

$$h_i = f\left(W_v x_i + \sum_{j \in C(i)} W_{R(i,j)} \cdot h_j + b\right) \quad (2)$$

where $h_i$ is again the embedding for some node i in the tree, $x_i$ is the embedding for the word corresponding to this node, j is an index that ranges over the children, C(i), of the node i, and $W_{R(i,j)}$ is a matrix associated with the specific syntactic relation between node i and its $j^{th}$ child. $h_j$ is the embedding corresponding to this child.

Once a vector representation of an initial sentence is produced by the encoder network, the vector representation is passed to a tree-structured decoder network [3], which is run in reverse by propagating activities from the root of the tree down to the leaves. A word prediction is generated at each node in this second tree using a softmax classifier [4], which allows us to define a cross-entropy loss function, J, over nodes and trees as follows:

$$J(\theta) = -\sum_i \sum_j t_j^{(i)} \log p(c_j^{(i)} | s_i) \quad (3)$$

where $t_j^{(i)}$ is the target probability (i.e. 1) for the correct word at the $j^{th}$ node in the $i^{th}$ training example, $p(c_j^{(i)}|s_i)$ is the computed probability for this word given the input sentence $s_i$, and $\theta$ is the set of combined parameters for the encoder and decoder networks. This cost function can be applied using input and output sentences standing in any desired discourse relation.

Figure 2:
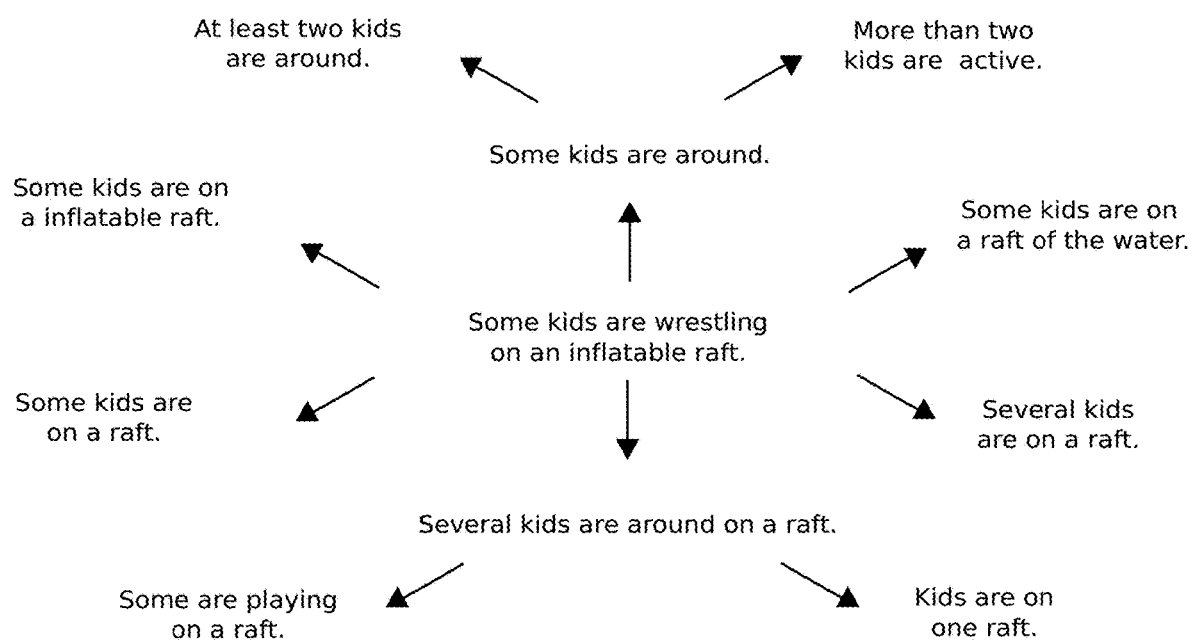
FIG. 2 is a diagram of an example discourse graph for the relation of entailment generated by the coupled encoder and decoder networks.

System parameters are optimized via stochastic gradient descent by back-propagating through both the decoder and encoder tree for each training example. The result of training is a set of weights associated with specific syntactic relations for both encoding and decoding, a set of weights for predicting a distribution over words from a node embedding for each syntactic relation, and a set of biases. When the trained system is used to perform inference using a novel input sentence, the encoder is assembled into an instantiation of a tree using the learned encoding weights. The decoder is then also assembled into an instantiation of a tree using the learned decoding weights, and activation is propagated through the encoder and into the decoder to produce a probability distribution over words at each tree node. The words with the highest probability at each node are then used to construct the predicted entailment for the input sentence. The tree structure for the decoder can either be selected randomly or stipulated ahead of time. Changing the tree structure of the decoder introduces a corresponding change to the predicted sentence. Iteratively performing encoding and decoding with diverse tree instantiations allows for the generation of discourse graphs of the sort depicted in FIG. 2

Figure 3:
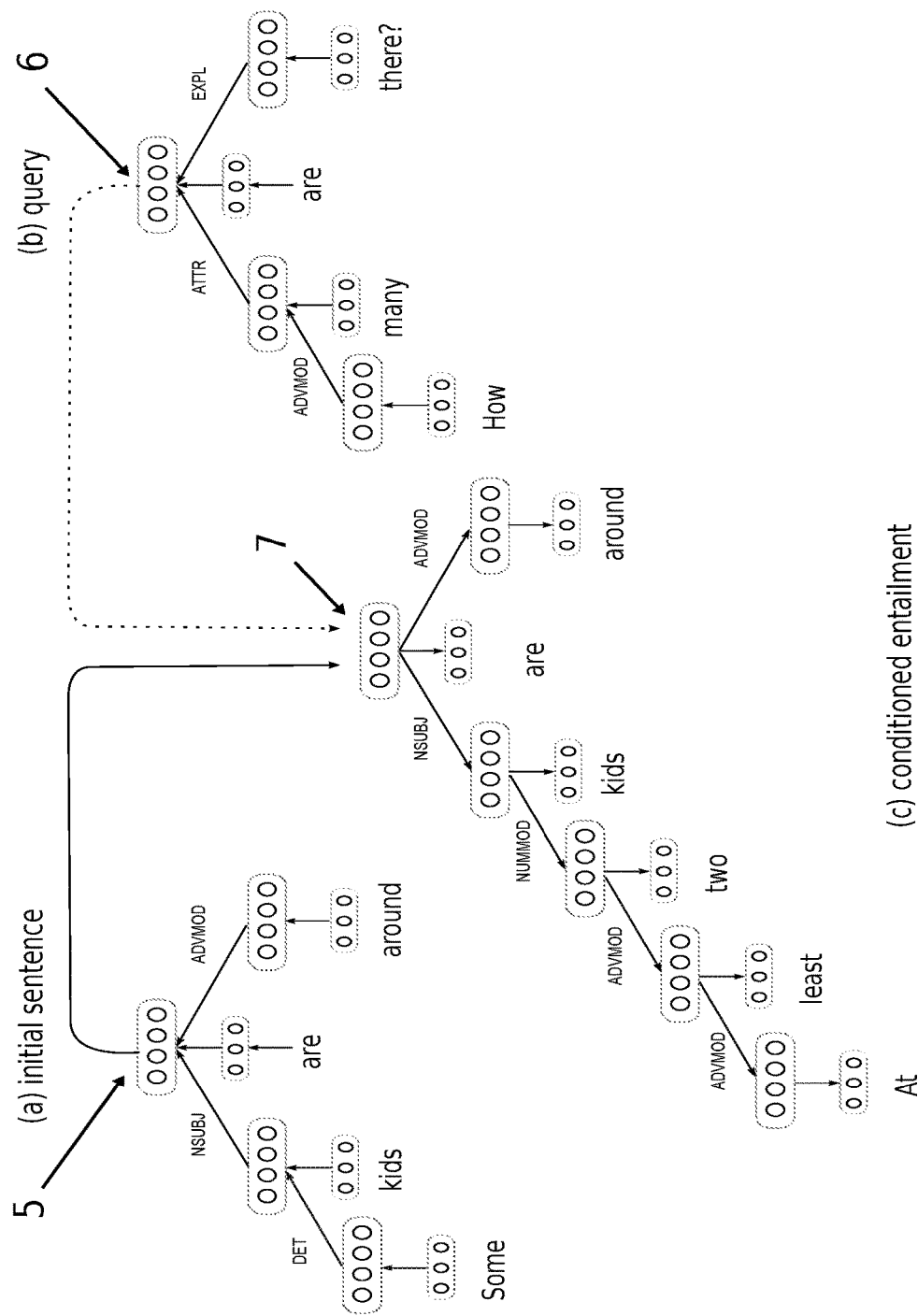
FIG. 3 is a diagram illustrating how a query can be encoded and used to condition the decoding so as to generate a sentence that answers the query.
Figure 4:
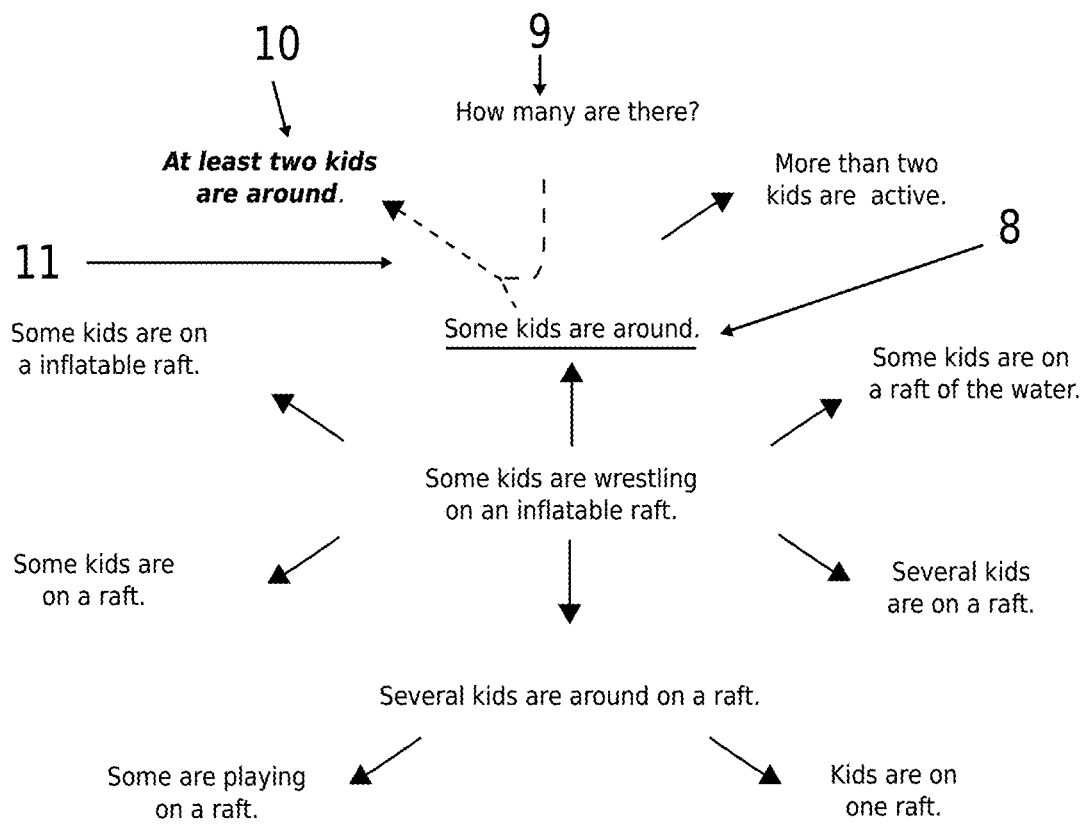
FIG. 4 is a diagram illustrating how conditioned decoding can be used to selectively navigate a discourse graph.

To perform the further task of traversing a discourse graph to provide answers to queries, the encoding procedure is modified produce vector representations of two linguistic expressions using separate instantiations of the encoder, as illustrated in FIG. 3. The first vector representation [5] corresponds to an input sentence, while the second vector representation [6] corresponds to a question or prompt concerning this sentence. These representations are then added together [7] and passed to the decoder network as before. The purpose of adding the query representation is to constrain the decoding procedure to produce the unique sentence that is an answer to the query. (Note that every answer to a question about an input sentence is a specific further sentence that is related to the input sentence in some way). Discourse graph traversal can be performed using the parameters learned by optimizing the loss function in (3). Alternatively, queries can be directly incorporated into the learning process by modifying the loss function as follows:

$$J(\theta) = -\sum_i \sum_j t_j^{(i)} \log p(c_j^{(i)} | s_i, q_i) \quad (4)$$

where again $t_j^{(i)}$ is the target probability (i.e. 1) for the correct word at the $j^{th}$ node in the $i^{th}$ training example, $p(c_j^{(i)}|s_i, q_i)$ is the computed probability for this word given the input sentence $s_i$ and the query sentence $q_i$, and $\theta$ is the set of combined parameters for the encoder and decoder networks. Once trained, the system can answer arbitrary questions about arbitrary sentences by navigating the discourse graphs that are implicit in its parameters, as depicted in FIG. 4. For example, if the sentence "Some kids are around" [8] is encoded, along with the query "How many are there?" [9], the decoder will generate the sentence "At least two kids are around" [10] and thereby implement one specific transition [11] amongst the many allowed by the discourse graph in FIG. 4.

To implement discourse graph generation and traversal in a spiking network, we use a differentiable approximation of the standard leaky integrate-and-fire (LIF) neuron model in all layers of the encoder and decoder networks during training (Hunsberger, E. & Eliasmith, C. 2015. Spiking deep networks with LIF neurons. arXiv preprint arXiv: 1510.08829). After training, a genuine LIF neuron model can then be swapped in place of the approximation with a minimal loss of performance provided that the spikes produced by each neuron are filtered appropriately (Hunsberger Eliasmith, 2015). The present invention extends these methods in the following ways. First, the word embeddings that initially provide input to the system are encoded into spiking activities by injecting a current J into each of the leaf node neurons in the encoding tree shown in FIG. 1. This current is proportional to the similarity between the supplied word embedding and a vector that characterizes the "preferred" embedding of the neuron. The activity of a neuron can be calculated based on the input current, J, and a nonlinear neuron model G, yielding the activity of each neuron $a_i$ as $$a_i = G[J] \quad (5)$$

Possible algorithms for computing the neuron model G include the non-spiking sigmoid nonlinearity (Hopfield, J. 1984. Neurons with graded response have collective computational properties like those of two-state neurons. Proceedings of the National Academy of Sciences, 81.10, 3088-3092), and the spiking LIF model (Lapicque, L. 1907. Recherches quantitatives sur l'excitation electrique des nerfs traitee comme une polarisation. J. Physiol. Pathol. Gen, 9.1, 620-635).

Second, the spikes produced by each neuron in the leaf nodes of the encoding network are then filtered and weighted to provide input current to neurons in their immediate parent nodes, until spiking activity has been propagated through the encoder and decoder networks, as before. The filtered spikes produced by the decoder's leaf nodes are weighted by vectors found via training that determine how much each spike contributes to the estimation of the inferred probability distribution over words at each leaf node. Alternative methods for implementing the computations performed by the encoder and decoder networks in spikes are also possible (Eliasmith, C. & Anderson, C. 2003. Neural Engineering: Computation, Representation, and Dynamics in Neurobiological Systems. MIT Press).

The aforementioned embodiments have been described by way of example only. The invention is not to be considered limited by these examples and is defined by the subsequent claims. All references cited herein are incorporated by reference in their entirety.

DISCUSSION

The current invention implements methods for generating and traversing discourse graphs so as to perform simple forms of question answering, summarization, and dialogue. The primary novelties in the invention concern (a) the use of coupled tree-structured networks for encoding and decoding the sentences that make up a discourse graph, (b) the use of conditioned decoding to perform inference on a discourse graph and thereby answer simple questions or make simple dialogue transitions, and (c) the use of spiking implementations of the coupled tree-structured networks so as to improve computational efficiency.

To assess the quality of the sentences predicted by the system, FIG. 5 depicts the results of a simple experiment used to compare human evaluations of system-generated and ground-truth examples of the entailment discourse relation. During the study, participants are shown a series of sentences introduced as true captions of unseen images. For each caption, the participants are shown an alternate caption and asked to evaluate the likelihood that it is also true of the corresponding image. Evaluations are recorded using a five point Likert scale that ranges from "Extremely Unlikely" (1) to "Extremely Likely" (5). The original caption in each case is the first sentence in a pair randomly chosen from the widely used Stanford Natural Language Inference (SNLI) dataset (Bowman et al., 2015), while the alternate caption is either (a) a human-generated example of entailment from SNLI [12], (b) a system-generated example of entailment [13], (c) a human-generated example of contradiction from SNLI [14], or (d) a human-generated example of a neutral hypothesis from SNLI [15]. The results in FIG. 5 indicate that system-generated transitions are rated quite positively, and much closer to the human-generated entailments than to the human-generated contradictions. These results provide evidence that system is able to generate reasonably accurate discourse graphs for the specific relation of entailment.

For computationally efficient implementations of the system, instantiations of the encoder and decoder networks can be implemented using spiking neurons in each layer. These spiking neuron implementations can be simulated either indirectly via software, or directly via special-purpose neuromorphic hardware. Spiking neuron models created using the methods described above have been run on several pieces of neuromorphic hardware, including SpiNNaker (Mundy et al., 2015. An efficient SpiNNaker implementation of the neural engineering framework. International Joint Conference on Neural Networks). and Neurogrid (Choudhary et al., 2012. Silicon neurons that compute. International Conference on Artificial Neural Networks).

What is claimed:

1. A system for automatically generating and traversing graphs of sentences that stand in directed discourse relations to one another, comprising:
   an encoder neural network assembled into an indefinite number of tree-structures;
   a decoder neural network, coupled to the encoder neural network, assembled into an indefinite number of tree-structures; and
   input word computer representations that propagate activity through the encoder neural network to produce a fixed-width vector representation of each input word, which is then used to propagate activity through the decoder neural network to generate a predicted sentence satisfying a discourse relation of interest
   wherein the encoder neural network and the decoder neural network are artificial neural networks implemented in network layers by a computer processor executing computer readable instructions stored on a computer readable medium;
   wherein iterative applications of encoding and decoding carried out by the encoding and decoding neural networks are used to generate discourse graphs from a single input sentence;
   wherein links in the discourse graphs correspond to linguistic relations;
   wherein links in the discourse graphs correspond to linguistic relations including entailment, contradiction, elaboration, explanation, contrast, and parallelism.

2. The system of claim 1, wherein multiple instantiations of the decoder neural network are coupled with the same instantiation of the encoder neural network, so as to predict multiple distinct output sentences using the same collection of input word representations.

3. The system of claim 1, wherein weight matrices of the encoder and decoder neural networks are tied to specific syntactic relations in each tree-structure, such that the same set of weights is used for each occurrence of a given syntactic relation in a given tree-structure.

4. The system of claim 1, wherein non-linear transformations performed by each network layer involve a gating mechanism.

5. The system of claim 1, wherein two or more instantiations of the encoding neural network provided with distinct input word representation are coupled to an instantiation of the decoding neural network; wherein inputs to the encoder neural networks include, but are not limited to, question-sentence pairs, and the output predicted by the decoder neural network includes, but is not limited to, an answer to the question-sentence pairs.

6. The system of claim 5, wherein iterative applications of encoding and decoding are used to traverse arbitrary discourse graphs for implementing a dialogue system or a question-answering system.

7. The system of claim 1 wherein each network layer comprises a plurality of nonlinear components, and each nonlinear component is configured to generate an output in response to an input;

the output from each nonlinear component is weighted by coupling weights of corresponding weighted couplings and weighted outputs are provided to coupled modules; and the inputs to the systems are either discrete or continuous in time.

8. The system of claim 7, wherein the nonlinear components are software simulations of neurons.

9. The system of claim 8, wherein the simulated neurons generate spikes.

10. The system of claim 8, wherein the components are implemented in special-purpose hardware including, but not limited to, neuromorphic computers.

11. A method for the implementing the system in claim 1, wherein the encoder and decoder neural network parameters are determined through error-driven learning rules including, but not limited to, backpropagation; wherein the error-driven learning rules are used to optimize objective functions including those that promote the decoding of novel sentences that exhibit the following relations to the sentences provided as inputs during encoding: entailment, contradiction, elaboration, explanation, contrast, and parallelism.

12. The method of claim 11, wherein the type of nonlinear transformation performed by each network layer is optimized to make use of a gating mechanism.

* * * * *